United States Patent
Matzoll et al.

(10) Patent No.: US 7,559,258 B2
(45) Date of Patent: Jul. 14, 2009

(54) TORQUE SENSOR USING SIGNAL AMPLITUDE ANALYSIS

(76) Inventors: Robert J. Matzoll, 2800 Patrick Henry Dr., Unit 602, Auburn Hills, MI (US) 48326; Thomas T. Stapleton, 1900 Buell Ct., Rochester, MI (US) 48306

( * ) Notice: Subject to any disclaimer, the term of this patent is extended or adjusted under 35 U.S.C. 154(b) by 0 days.

(21) Appl. No.: 11/616,131

(22) Filed: Dec. 26, 2006

(65) Prior Publication Data
US 2007/0113680 A1    May 24, 2007

Related U.S. Application Data

(63) Continuation-in-part of application No. 10/867,005, filed on Jun. 14, 2004, now abandoned.

(60) Provisional application No. 60/478,120, filed on Jun. 12, 2003.

(51) Int. Cl.
*G01L 3/00* (2006.01)

(52) U.S. Cl. .................. 73/862.08; 73/862.21

(58) Field of Classification Search .................. 73/862.321–862.326, 862.08
See application file for complete search history.

(56) References Cited

U.S. PATENT DOCUMENTS

| | | | |
|---|---|---|---|
| 3,834,822 A | 9/1974 | Stapleton, et al. |
| 4,345,481 A | 8/1982 | Schroyer |
| 4,347,748 A | 9/1982 | Pierson |
| 4,430,566 A | 2/1984 | Searle |
| 4,527,898 A | 7/1985 | Stapleton |
| 4,693,123 A | 9/1987 | Bacardit |
| 4,746,805 A | 5/1988 | Stapleton |
| 4,785,675 A | 11/1988 | Takasu et al. |
| 4,896,544 A | 1/1990 | Garshelis |
| 4,982,105 A | 1/1991 | Takahashi |
| 5,001,937 A | 3/1991 | Bachtel et al. |
| 5,014,560 A | 5/1991 | Hutchison et al. |
| 5,153,445 A | 10/1992 | Stapleton |
| 5,233,407 A | 8/1993 | Ogata |
| 5,247,839 A | 9/1993 | Okutani et al. |
| 5,253,531 A | 10/1993 | Walker et al. |
| 5,331,169 A | 7/1994 | Tanaka et al. |
| 5,369,583 A | 11/1994 | Hazelden |

(Continued)

FOREIGN PATENT DOCUMENTS

DE    198 23 903 A1    12/1999

(Continued)

*Primary Examiner*—Lisa M Caputo
*Assistant Examiner*—Freddie Kirkland, III
(74) *Attorney, Agent, or Firm*—Young Basile, PC (57) ABSTRACT

An apparatus and method for noncontact, optical measuring of any of torque, torque angle, shaft speed, and shaft direction by at least one of a rotatable or non-rotatable flexure with input and output ends, a light source for generating a light signal, a field mask carrying a pattern of opaque and transparent lines adapted to form an image of overlaid lines on the field mask and reflected from lines on the input and output ends of the flexure, and a detector for receiving a light signal from the overlaid lines in the image, the detector generating an output light signal waveform proportional to the torque, and comparing amplitude variations between input and output end waveforms to provide a measurement of torque.

23 Claims, 5 Drawing Sheets

U.S. PATENT DOCUMENTS

| | | |
|---|---|---|
| 5,477,332 A | 12/1995 | Stone et al. |
| 5,490,430 A | 2/1996 | Anderson et al. |
| 5,531,127 A | 7/1996 | Hazelden |
| 5,606,137 A | 2/1997 | Penketh |
| 5,636,024 A | 6/1997 | Crookham et al. |
| 5,636,137 A | 6/1997 | Hazelden |
| 5,723,794 A | 3/1998 | Discenzo |
| 5,754,295 A | 5/1998 | Mitchell |
| 5,837,908 A | 11/1998 | Ng et al. |
| 5,841,132 A | 11/1998 | Horton et al. |
| 5,859,919 A | 1/1999 | Holland et al. |
| 5,864,393 A | 1/1999 | Maris |
| 5,878,153 A | 3/1999 | Mikulec et al. |
| 6,055,860 A | 5/2000 | Pfanstiehl |
| 6,088,116 A | 7/2000 | Pfanstiehl |
| 6,188,058 B1 | 2/2001 | Tullis |
| 6,318,188 B1 | 11/2001 | Yassui et al. |
| 6,341,426 B1 | 1/2002 | Okumura |
| 6,347,554 B1 | 2/2002 | Klingler |
| 6,354,156 B1 | 3/2002 | Porth et al. |
| 6,381,526 B1 | 4/2002 | Higashi et al. |
| 6,382,034 B1 | 5/2002 | Yasui et al. |
| 6,386,052 B1 | 5/2002 | Satoh et al. |
| 6,426,497 B1 | 7/2002 | Martinez et al. |
| 6,450,044 B1 | 9/2002 | Eissenhauer et al. |
| 6,456,090 B1 | 9/2002 | Ishikawa et al. |
| 6,501,068 B1 | 12/2002 | Eisenhauer |
| 6,513,394 B1 | 2/2003 | Gutjahr et al. |
| 6,587,211 B1 | 7/2003 | Gelbert |
| 6,761,075 B2 | 7/2004 | Steinlechner |
| 2003/0015590 A1 | 1/2003 | Chen |
| 2004/0255699 A1 * | 12/2004 | Matzoll et al. ........ 073/862.324 |

FOREIGN PATENT DOCUMENTS

| | | |
|---|---|---|
| DE | 199 32 965 A1 | 1/2001 |
| GB | 2 093 991 | 9/1982 |
| WO | WO 02/18894 A1 | 3/2002 |

* cited by examiner

TORQUE SENSOR USING SIGNAL AMPLITUDE ANALYSIS

CROSS REFERENCE TO RELATED APPLICATIONS

This application is a Continuation-In-Part of co-pending U.S. patent Ser. No. 10/867,005, filed Jun. 14, 2004 in the names of Robert J. Matzoll and Thomas T. Stapleton, which claims the benefit of the Jun. 12, 2003 filing date of U.S. Provisional Application No. 60/478,120, the entire contents of both applications being hereby incorporated by reference.

BACKGROUND

The present invention relates to torque sensors, specifically to torque sensors using non-contact optics for the measurement of torque, torque angle, flexure speed, flexure direction and flexure rotational travel.

A conventional method and device for measuring torque generally requires physical contact with the torque sensor's center shaft. Applying torque to a shaft generates two principal lines of stress along helical lines which are orthogonal to each other on the surface of the shaft. Strain gauges are bonded in a cross arrangement along the helical lines. The strain gauges are coupled to measuring electronics by slip rings. However, these arrangements are difficult to implement.

Non-contact, optical based torque sensors are also known. Such sensors make use of a flexure or shaft, typically formed of metal. One end of the shaft is connected to a driving member, such as a motor, and the other end is connected to a tool or bit which drives a fastener, such as a bolt, to a tightened state, for example. Increased torque on the output end of the shaft as the bolt tightens causes rotation of the output end to lag behind rotation of the driven input end of the shaft. This lag can be used as an indicator of the amount of rotation of the output end which is proportional to the applied torque.

An example of an optically based torsion sensor for measuring torsion in a rotating shaft requires usage of a band consisting of alternating high and low reflectivity regions, The band is stationed on the shaft at the desired location of measurement. One sensor head is located to correspond to each band. Light is projected onto the respective band by the corresponding sensor. Furthermore, each sensor collects the light reflected by the high reflectivity region(s) of the corresponding band. The phase displacement between the intensities of the reflected light at the sensor heads is used to determine torsion on the rotating shaft.

However, it would be desirable to provide a torque sensor with non-contact optics to make implementation a lot simpler than conventional torque measurement methods and devices. It would also be desirable to provide a torque sensor that is not just limited to the measurement of a dynamic torque, but is also capable of measuring torque angle and flexure direction of travel without flexure rotational movement, i.e., in a stall condition.

SUMMARY

An apparatus for the measurement of any of the torque, torque angle, flexure speed, flexure direction, and flexure rotational travel. The apparatus includes a non-contact rotary optical displacement sensor, and a rotatable flexure with input and output ends. The non-contact rotary optical displacement sensor also includes a light source for generating a light signal. The flexure may contain a pattern of reflective and non-reflective lines associated with input and output ends. Alternatively, patterns of reflective and non-reflective lines may be on the input and output shaft of the flexure or projected onto the input and output shafts. The sensor includes a field adapted to pass light onto the reflective and non-reflective lines associated with the flexure.

The sensor also includes detector means for receiving a light signal from the field mask. The detector means generates output signals which are a function of the relative position of the patterned position of the patterned field mask lines and the flexure's pattern of lines.

The flexure can include the reflective and non-reflective lines being equi-circumferentially spaced about the input and output ends of the flexure.

The field mask is mounted about a circumference of the flexure. Furthermore, the field mask is fixed and stationarily supported relative to the flexure by mounting means. The mounting means includes, in one aspect, an arm securely fixed to an angle bracket that is fixed to a housing surrounding the flexure. Alternatively, the field mask may be mounted about a circumference of the input and output shaft of the flexure.

The field mask opaque and transparent lines of the apparatus share the same size and direction.

The opaque and transparent lines of the flexure and the field mask form a pattern of overlaid reflective and non-reflective lines on the field mask, Alternatively, the opaque and transparent lines and the input and output end coupler lines form a pattern of overlaid reflective and non-reflective lines.

The light signal received by the detector in the apparatus is digitized and transmitted to a signal processor for analysis.

A method of optically measuring one of torque, torque angle, shaft speed, and shaft direction comprises the steps of providing a flexure element, coupling an input end of the flexure element to a torque transmitting mechanism that will angularly displace the flexure element in proportion to the applied torque and cause angular displacement between an output end of the flexure coupled to a rotatable element and the input end and measuring the displacement of one end of the flexure relative to the other end to yield a measurement of torque.

The apparatus and method has been designed to simplify the complex audit requirement for critical joints with high installation torque and frictional scatter. The sensor has been designed to provide a torque sensor with non-contact optics to make implementation simpler than conventional torque measurement methods and devices. Furthermore, the apparatus provides a torque sensor that is not limited to the measurement of torque as conventional torque measurement devices because the sensor is also capable of measuring torque angle, flexure speed, and flexure direction of travel under moving and stalled conditions.

BRIEF DESCRIPTION OF THE DRAWING

The description herein makes reference to the accompanying drawing wherein like reference numerals refer to like parts throughout the several views, and wherein.

DETAILED DESCRIPTION

Figure 1:
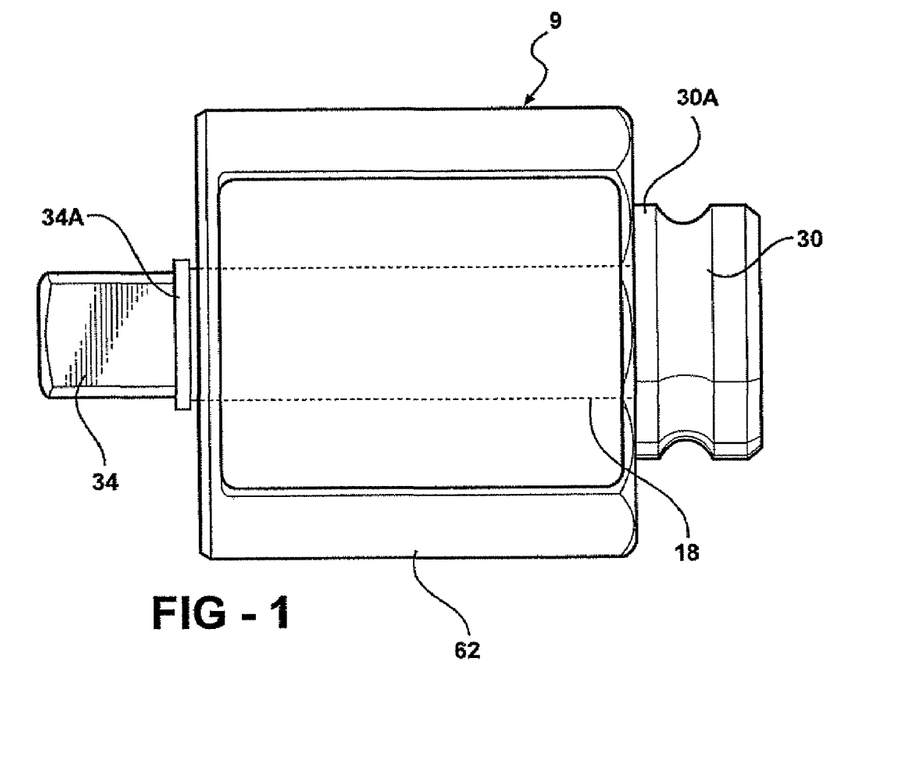
FIG. 1 is a front elevational view of an optical torque sensor.
Figure 2:
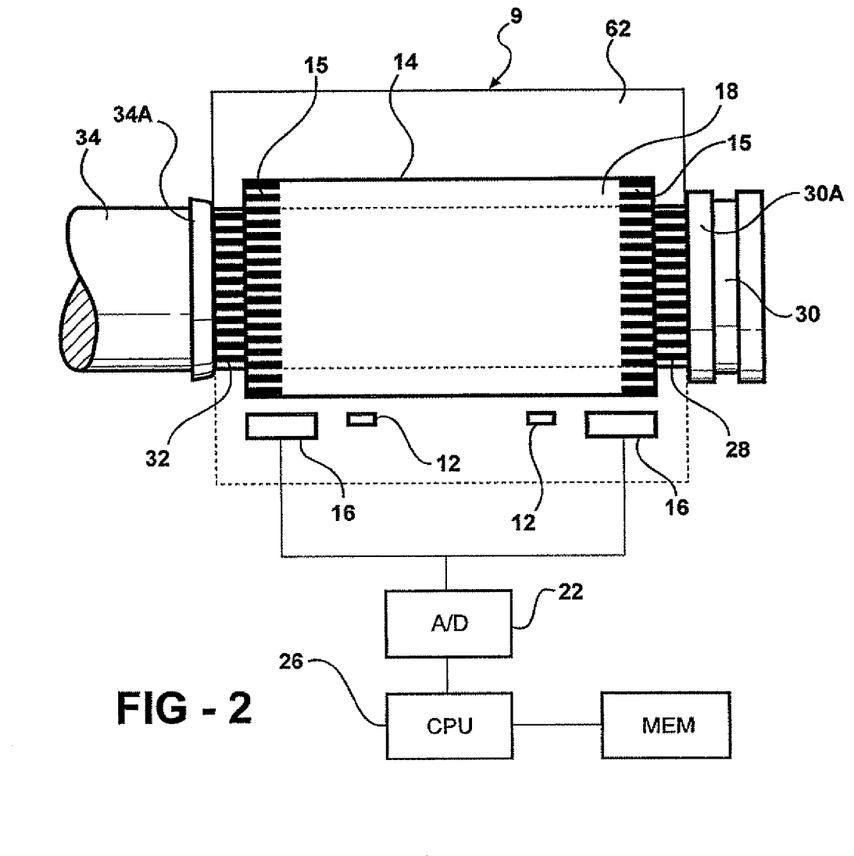
FIG. 2 is a pictorial representation of the torque sensor of FIG. 1 coupled to control circuitry.

With reference now to the drawings, features are illustrated only by example and not for purposes of limitation. FIGS. 1 and 2 show a rotary torque sensor apparatus 9 which is particularly useful in measuring torque being transmitted to an angularly movable or rotatable element, such as a fastener. The apparatus 9 includes an element, called a flexure 18 with an input end 30A and an output end 34A, in line with the torque transmitting mechanism, that will angularly displace to a degree that is proportional to the torque transmitted to the fastener. The angular displacement is then measured to yield a measurement of torque. The non-contact optical method of measurement described herein measures any of the amount of angular flexure displacement, flexure speed, and/or flexure direction and flexure rotational travel.

Displacement can occur by twist or compression of the flexure 18 relative to the displacement of an input and output coupler 30 and 34, respectively, attached to the input and output end 30A and 34A, respectively, of the flexure 18.

Although the flexure 18 could be formed of a metal, such as steel, according to one aspect, the flexure 18 is formed of a displaceable polymer, such as urethane, elastomer, synthetic rubber, etc. A urethane formed flexure 18 will have sufficient rigidity so that an output end 34A will repeatedly displace the same amount under the same applied torque or force over a wide load and temperature range. Further, forming the flexure 18 of a polymer, such as urethane for example only, provides the flexure 18 with a greater amount of flex or displacement at lower torque, which facilitates sensitive, accurate measurement in low torque devices, such as power screwdrivers.

Figure 4:
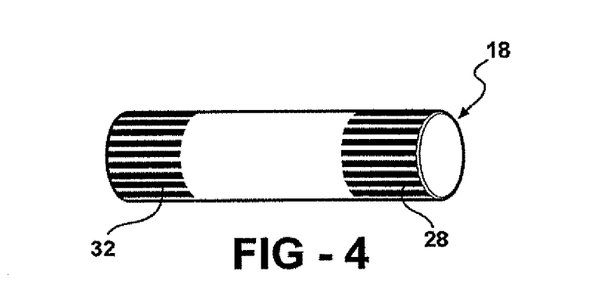
FIG. 4 is a perspective of the flexure of the torque sensor.
Figure 9:
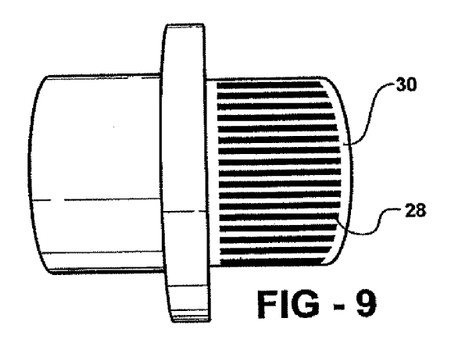
FIG. 9 is a side view of an input coupler possessing reflective and non-reflective lines.

A pattern of fine parallel lines 28 and 32, alternatively reflective and non-reflective, are applied to the ends of the flexure 18 as shown in FIGS. 2 and 4. Alternatively, reflective and non-reflective lines 28 and 32 may be applied onto or projected onto an input and output couplers 30 and 34, respectively, as shown in FIG. 9, to which the flexure 18 is firmly attached. When the lines 28 and 32 are applied to the ends of the flexure 18, the lines 28 and 32 may be parallel to the longitudinal axis of the flexure 18 when the flexure 18 is not subjected to external forces.

Figure 9A:
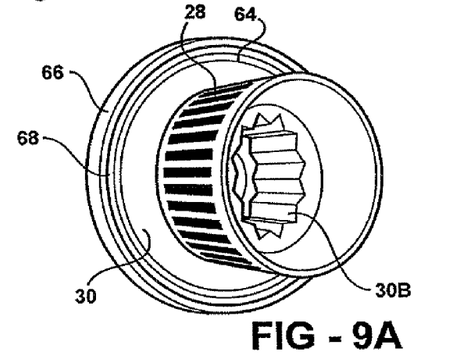
FIG. 9A is a perspective view of the input coupler of FIG. 9 possessing an internal mating spline fitting for a splined flexure.
Figure 10:
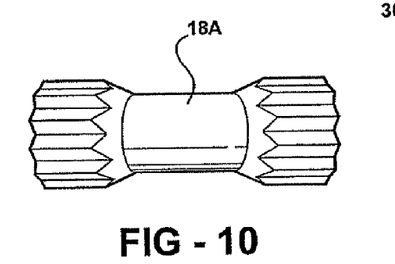
FIG. 10 is a perspective view of the splined flexure.
Figure 10A:
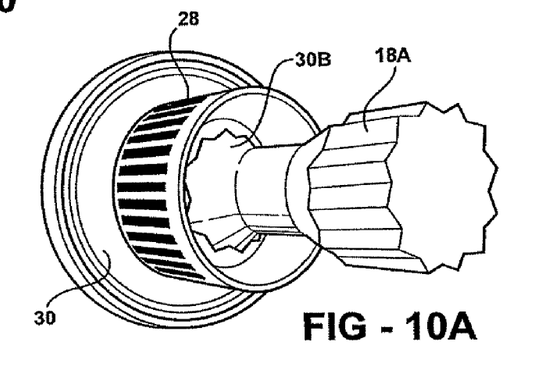
FIG. 10A is a perspective view of the splined flexure inserted into the internal mating spline fitting of the input coupler of FIG. 9.

When the reflective and non-reflective lines 28 and 32, as shown in FIGS. 9 and 9A, are applied onto or projected onto the input coupler 30 and output coupler 34, a splined flexure 18A is used, as shown in FIGS. 10 and 10A. FIG. 10A depicts the splined flexure 18A inserted into the input coupling 30 spline fitting 30B. The input coupler 30 and output coupler 34 possess internal mating spline fittings 30B, as shown in FIG. 10A, corresponding to the splined flexure 18A to hold and drive the flexure 18A. As shown in FIG. 9A, the bearing 66 mounted coupler 30 includes a silver ring 64. The ring 64 is centered by use of an o-ring 68 pressed around the spline fitting 30B that is welded to the backside of the coupling 30.

Figure 6A:
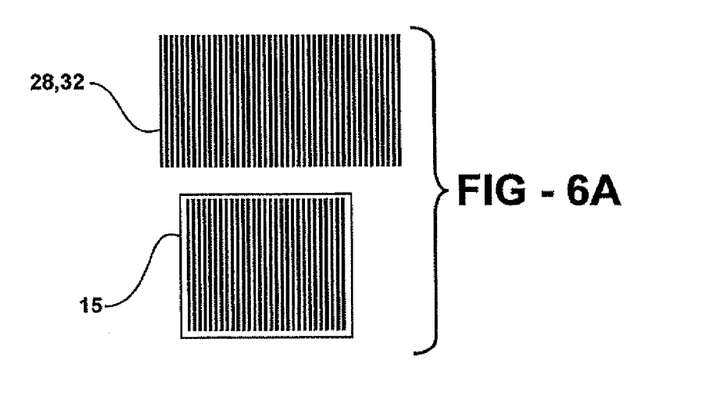
FIG. 6A is a pictorial side-by-side representation of gradient lines on the flexure and field mask.
Figure 6B:
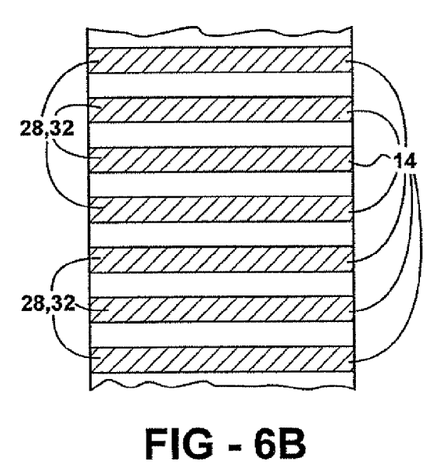
FIG. 6B is a pictorial representation of the gradient lines prior to loading.
Figure 6C:
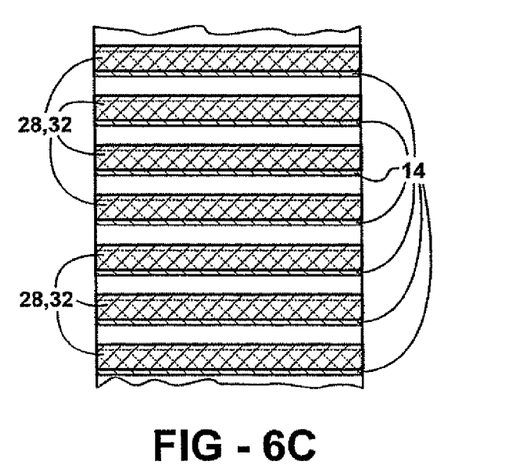
FIG. 6C is a pictorial representation, similar to FIG. 6B, but showing the gradient lines resulting from torsional lag in the lines on the output end of the flexure.

When the reflective and non-reflective lines 28 and 32, shown in FIGS. 6A, 6B and 6C, are applied to the flexure 18, the lines 28 and 32 may be applied to the ends of the flexure 18 by any suitable means, including printing, photoetching, etc. The lines 28, 32 are preferably equi-circumferentially spaced about the ends of the flexure 18. The lines 28, 32 may be formed partially or completely around the circumference of the flexure 18 or couplers 30 and 34.

Figure 5A:
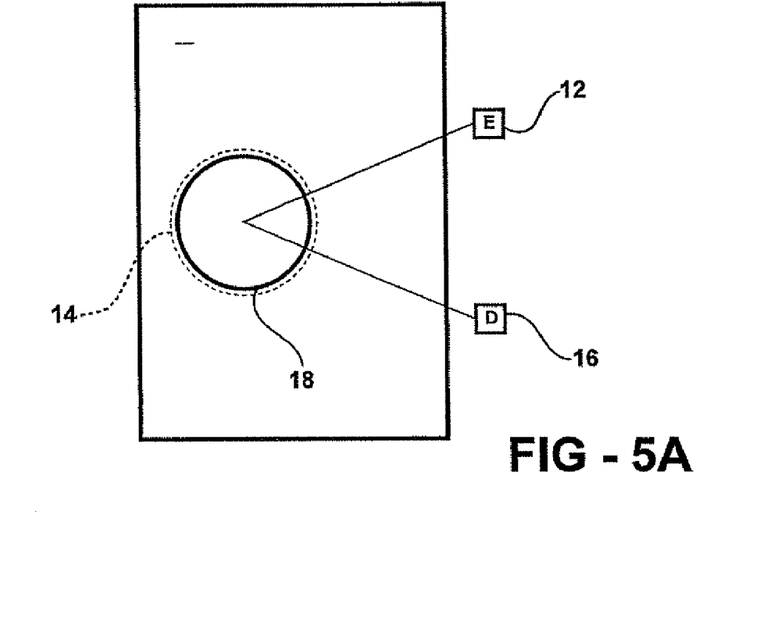
FIGS. 5A and 5B are end and plan elevational views showing the reflected light paths between the light emitters and light detectors of the torque sensor shown in FIG. 2.
Figure 5B:
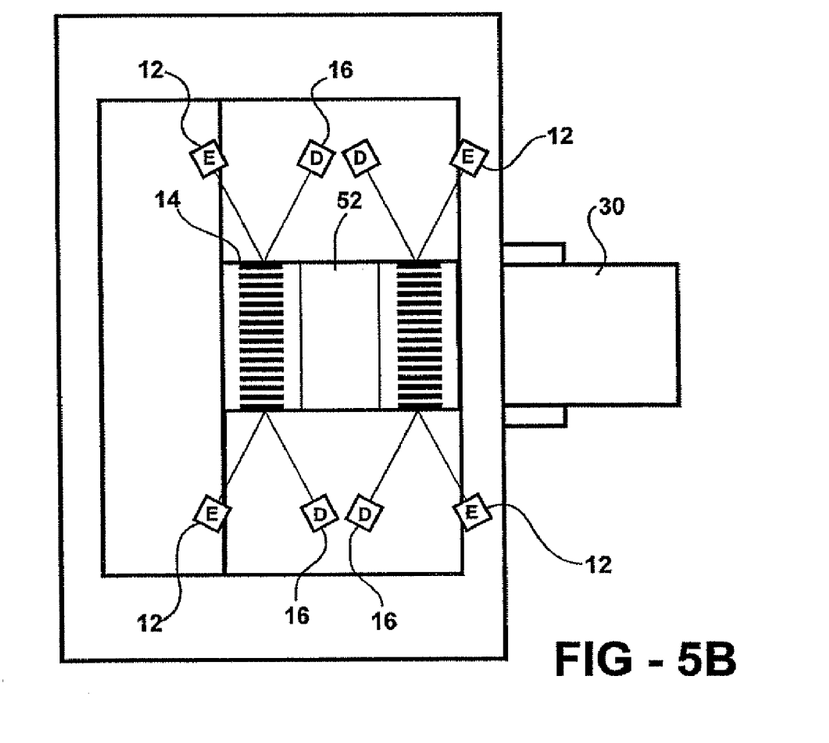

As the flexure 18 displaces due to the torque applied to one end, such as the input end 30A, the lines 32 on the output end 34A become angularly displaced relative to the lines 28 on the input end 30A. Optical systems 9 at each end of the flexure 18, consisting of a light source 12, a field mask 14 and a silicon diode light detector 16, measure this displacement as shown in FIGS. 2, 5A and 5B.

Although two pairs of light sources 12 and detectors 16 are employed at each end of the flexure 18, it will be understood that this is by way of example only, as an optical sensor 9 may have a single light source/detector at each input 30A and output end 34A.

The light source 12 may be any suitable light source. Although a laser can be employed as the light source 12, according to one aspect, the light source 12 may be formed of an inexpensive LED.

Figure 8:
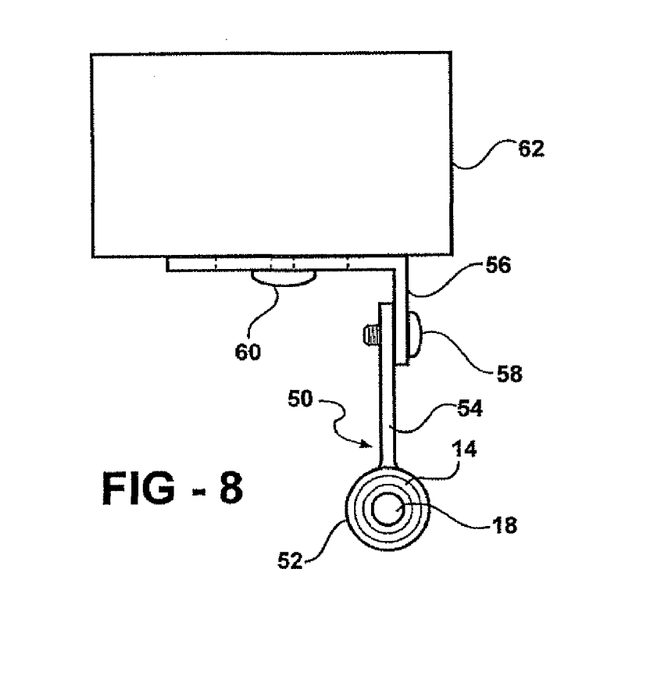
FIG. 8 is an end view showing the mounting of the field mask over the flexure shown in FIG. 2.

The field mask 14 is formed of a thin, transparent material, such as a plastic film, which is mounted a slight distance about the circumference of the flexure 18, preferably over each series of lines 28 and 32. The mask 14 is fixedly and stationarily supported relative to the rotating flexure 18 by means of a mount 50, as shown in FIG. 8. The mount 50 includes a support 52 in the form of a ring mounted intermediate to the ends of an elongated, cylindrically shaped sleeve used to form and carry the field masks 14 for each end of the flexure 18. A grating formed of transparent and opaque lines or gradient lines 15 as shown in FIG. 2 are formed, as described hereafter, on each end of the sleeve. Alternatively, the field mask 14 may be mounted a slight distance about the circumference of the input 30 and output couplers 34 when the reflective and non-reflective lines 28 and 32 are applied onto or projected onto the input 30 and output couplers 34.

As shown in FIG. 8, the field mask 14 is fixed a short distance away from the outer surface of the flexure 18 by the mount 50 which, by example only, includes an arm 54 connected to the ring 52. The arm 54 is secured to an angle bracket 56 by suitable attachment means, such as a fastener 58. The angle bracket 56 is in turn fixed by a fastener 60 to a housing 62 surrounding the flexure 18.

As shown in FIG. 2, the field mask 14 includes a pattern of transparent and opaque lines 15 that are identical in size and direction and substantially identical in spacing to the patterns of the lines 28 and 32 on the ends of the flexure 18. The lines 15 may be printed, etched or otherwise formed on the film at the appropriate positions by suitable means.

Light from the light source 12 passes through the field mask 14 and is reflected by the pattern of lines 28, 32 on the rotating flexure 18. The result of the interaction between the pattern of lines 28 and 32 on the flexure 18 and the pattern of lines 15 on the field mask 14, as the flexure 18 rotates, is a periodic variation in light flux passing through the field mask 14 as the reflective lines 28, 32 on the flexure 18 align and misalign with lines 15 on the field mask 14 as seen in FIG. 6B, which depicts a fill alignment, and FIG. 6C, which shows a partial misalignment. The signal produced in FIG. 3 by the detector 16 will be an analog triangular wave 20 whose frequency is equal to the frequency of the lines 28 or 32 on the rotating flexure 18 as they pass under the field mask 14.

The lines 15 on the mask 14 and the lines 28, 32 on the flexure 18 are arranged so as to form variable patterns which are reflective and non-reflective regions that result when two identical, repetitive patterns of lines are overlapped with imperfect alignment.

It will be understood that the patterns are not produced in the mask 14 or the flexure 18, but rather are a pattern of an image viewable by the human eye. In some places, opaque lines 15 on the mask 14 hide the reflective lines or spaces between the non-reflective lines 28, 32 on the flexure 18, creating a non-reflective viewable region. When the opaque lines 15 on the mask 14 align with the non-reflective lines 28, 32 on the flexure 18, the neighboring reflective areas between the non-reflective lines 15 and 28, 32 show through, The patterns formed by the regions of reflective and non-reflective lines compose the patterns which are imaged by the internal optics of the sensor 16.

Figure 7:
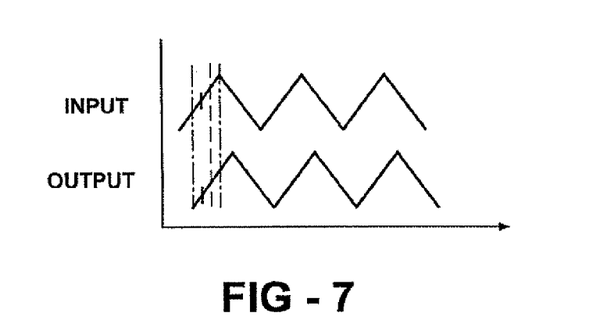
FIG. 7 is a waveform diagram depicting signals from the input end and the output end sensors.

As torque builds up, the lines 32 at the output end 34A of the flexure 18 lag more and more behind the lines 28 at the input end 30A in proportion to the torque, due to the displacement in the flexure 18. During such displacement, the relative position of the imaged pattern will change as the output end 34A of the sensor 9 connected to the rotating fastener head lags behind the input end 30A of the flexure 18 connected to the rotating power tool or drive source. Correspondingly, the triangular wave signal 20 from the output end 34A detector 16 lags behind the triangular wave signal 20 from the input end 30A detector 16 signal. These signals 20 can be digitized via an analog to digital converter 22 which samples the input and output waveforms shown in FIG. 7. The output of the analog-to-digital converter 22 for each of the input and output waveforms shown in FIG. 7 is a digital volt signal representative of the voltage of each of the waveforms sampled at the exact same time. The voltage amplitude difference between each sample point on the input waveform and the corresponding sample point in a time-wise manner, on the output waveform 15, is then calculated.

The input and output waveforms are triangular in shape, as shown in FIG. 7, due to the equal spacing between the grid lines 28, 32 on the flexure 18 and the grid lines 15 on the field mask 14.

As the torque applied to the input end of the flexure 18 increases, the flexure 18 twists and the output sensor sees a pattern that lags the pattern of the input end of the flexure 18 so that the triangular wave resulting from the output pattern lags the triangular wave from the input sensor as shown in FIG. 7. The degree of lag is proportional to the twist, and, therefore, to the applied torque.

At any given instant, a measurement of the torque can be made by comparing the signal amplitudes of the input and output sensors. These amplitudes will be independent of flexure speed down to and including zero speed. This enables torque to be uniquely measured in a stall condition.

Because the signals are triangular and therefore linear for a finite rotation, the system must keep track of the reversals at each maximum and minimum in order to give an accurate and non-ambiguous measurement.

It should be clear that a phase difference between the input and output waveforms is not measured. The measurement is of an amplitude difference which is translated into a measurement of the angular twist of the flexure 18 which is proportional to the torque applied to the flexure 18. The digital signal difference can then be entered into a signal processor, such as a computer 26 shown in FIG. 2, for analysis.

In such analysis, the voltage difference between each sample point on the input and output waveforms is compared to a look-up table or used in an algorithm to generate a corresponding torque value to thereby provide the magnitude of the torque at each sample point of the input and output waveforms.

Determination of the degree of angular lag by comparing the signals from the output end 34A of the flexure 18 to the input end 30A of the flexure 18 is straightforward, but may take into account the varying speed of the rotating flexure 18. The triangular waves 20 shown in FIG. 3 will change frequency, possibly rather abruptly, as the flexure 18 slows near the target torque value.

At some degree of torque, the displacement of the flexure 18 will equal the width of a line pair (combined reflective and non-reflective lines). At this point, the input and output detector waveforms will again be aligned, as they were with no torque applied.

Figure 3:
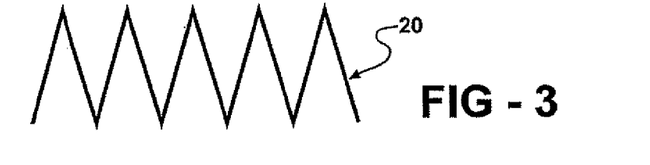
FIG. 3 is waveform of the output of the sensor shown in FIG. 1.

To avoid ambiguity, the control program executed in the signal analysis device 26 shown in FIG. 2, must keep track of the number of complete cycles, line by line, of the 360° shift the waveforms 20 shown in FIG. 3, have gone through. The complete torque measurement will be a function of this number plus the fractional shift measured via the detector 16 shown in FIGS. 2 and 5A of the rotary optical displacement sensor 9 between the two signals.

The angular velocity of both the input end 30A and the output end 34A of the flexure 18 can be measured by measuring the frequency of the signals (peak to peak) generated by the detectors 16 at the input end 30A and the output end 34A of the flexure 18, respectively.

The direction of rotation of the flexure 18 can be determined by providing two detection systems 16 at each end of the flexure 18 and comparing the signals generated by the two detection systems 16. These detectors 16 are positioned relative to one another, as shown in FIG. 5A, such that the signals generated by them are 90° out of phase with each other. By arbitrarily designating the two signals as A and B, rotation in one direction will produce signals where A leads B by 90°, see FIG. 7, whereas rotation in the opposite direction will produce signals where B leads A by 90°. Direction of rotation is thus determined by the relative phase between the two signals.

Torque angle is the angle through which the fastener is turned past the point at which a threshold torque is reached and until the target torque is reached. The sequence of events culminating in this measurement are as follows: Before the fastener begins to tighten, little torque is generated and the input end 30A and the output end 34A of the flexure 18 rotate at a common velocity and with little displacement in the flexure 18, as shown in FIG. 2. As the fastener begins to tighten, the torque begins to increase and reaches a threshold value. This results in an increase in the displacement of the ends of the flexure 18 that is detected and quantitatively measured by analysis of the input 30A and output end 34A detector 16 signals. Detection of the threshold torque initiates the measurement of angular rotation at the output end 34A of the flexure 18, as shown in FIG. 2. This measurement continues until the target torque is detected. At this point, the measurement of torque angle is complete and its value is stored in a memory for later display, printout or archiving. Measurement of angular rotation is accomplished by counting the number of triangular waves from the output end after threshold torque is attained. Since the number of lines around the flexure and spacing between lines is known, the number of degrees is also known, allowing us to calculate degrees per wave peak.

Final torque, which could be larger than target torque if the fastener driving mechanism is not properly controlled, can be measured by recording the measured torque at the point that the output end 34A of the flexure 18 comes to a stop. As the output end 34A of the flexure 18 slows to a near stop, the signals generated by the detectors 16 change very slowly. It is necessary to distinguish between a slow change and no change. For an accurate measure of final torque, it may preferred that the detector 16 signals be stored in a computer memory and subsequently analyzed to accurately determine the point in time that the output end 34A of the flexure 18 came to a stop.

What is claimed is:

1. A non-contact rotary optical displacement sensor apparatus for use in conjunction with a torque transmitting mechanism, the non-contact rotary optical displacement sensor comprising:
   a flexure with input and output ends;
   a pattern of spaced reflective and non-reflective lines on at least one of the flexure and an input coupler and an output coupler attached to the flexure;
   a light source for generating light to at least one of the flexures and the input coupler and the output coupler;
   a field mask including a pattern of equally spaced opaque and transparent lines disposed at the same spacing as the pattern of reflective and non-reflective lines, the pattern of opaque and transparent lines adapted to receive the light from the light source transmitted through the field mask that is reflected by the reflective and non-reflective line patterns to create an input end output light signal and an output end output light signal;
   a detector receiving the input end and the output end output light signals;
   means, responsive to the detector, for generating for each of the input and output ends of the flexure an input and an output triangular waveform, with the amplitude difference between the input waveform and the output waveform at a sample point on both waveforms being proportional to the amount of torque;
   an analog to digital converter digitizing the input end and the output end output light signals received by the detector into digitized signals at a plurality of sample points during each cycle of each input and output waveforms; and
   a signal processor acting on the digitized signals to produce torque related measurements based on amplitude differences between sampled points on the input and output waveforms.

2. The non-contact rotary optical displacement sensor of claim 1 wherein the pattern of reflective and non-reflective lines are disposed on the input and output ends of the fixture.

3. The non-contact rotary optical displacement sensor of claim 1 wherein the pattern of reflective and non-reflective lines are at least one of applied on and projected on the input and output coupler.

4. The non-contact rotary optical displacement sensor of claim 3 wherein the input and output coupler mate with a splined flexure.

5. The non-contact rotary optical displacement sensor of claim 1 wherein the pattern of reflective and non-reflective lines are disposed on the input and output ends of the flexure.

6. The non-contact rotary optical displacement sensor of claim 1 wherein the pattern of reflective and non-reflective lines are at least one of applied on and projected on the input and output coupler.

7. The non-contact rotary optical displacement sensor of claim 1 wherein the field mask cooperates in forming the output light signal based on the reflected pattern of lines on at least one of the rotating flexure and the input and output couplers.

8. The non-contact rotary optical displacement sensor of claim 1 wherein the detector receives the light signal from one of the overlaid lines on the flexure and the field mask, and overlaid lines from the input and output coupler and the field mask and generates an output signal indicative of the magnitude of the light signal.

9. The non-contact rotary optical displacement sensor of claim 1 wherein the field mask is formed of a transparent material.

10. The non-contact rotary optical displacement sensor of claim 9 wherein the field mask is mounted about at least one of a circumference of the flexure and a circumference of the input and output couplers.

11. The non-contact rotary optical displacement sensor of claim 10 further comprising:
    a mount fixedly and stationarily supporting the field mask relative to the flexure.

12. The non-contact rotary optical displacement sensor of claim 11 wherein the mount includes a support.

13. The non-contact rotary optical displacement sensor of claim 12 wherein the support is formed in the shape of a ring mounted intermediate to the ends of a sleeve forming and carrying the field mask.

14. The non-contact rotary optical displacement sensor of claim 13 wherein grating lines are formed on each end of the sleeve.

15. The non-contact rotary optical displacement sensor of claim 12 wherein the mount includes an arm connected to a ring.

16. The non-contact rotary optical displacement sensor of claim 15 wherein the arm is securely fixed to an angle bracket by attachment means.

17. The non-contact rotary optical displacement sensor of claim 16 wherein the angle bracket is affixed to a housing surrounding the flexure.

18. The non-contact rotary optical displacement sensor of claim 1 wherein the opaque and transparent lines of the field mask have the same size and orientation.

19. The non-contact rotary optical displacement sensor of claim 1 wherein the field mask opaque and transparent lines have different spacing relative to the spacing of input lines and output lines on the flexure.

20. The non-contact rotary optical displacement sensor of claim 19 wherein the field mask opaque and transparent lines and the flexure input and output lines form a pattern of reflective and nonreflective lines.

21. The non-contact rotary of claim 1 wherein the flexure is a compressive flexure.

22. The method of detecting the magnitude of torque applied to a torque transmitting article by a torque transmitting means, the method comprising the step of:
    detecting angular displacement between an input end and an output end of a torque transmitting member by digitized signals of amplitude variations of a plurality of sample points on input and output signals resulting from light transmitted through two patterns resulting from equally spaced lines of input and output end grids carried with the torque transmitting member and input and output grids carried on a field mask fixed about the torque transmitting member;

providing a flexure element;

coupling an input end of the flexure to a torque transmitting means that will displace an output end of the flexure in response to a rotatable element engaged by the flexure under applied torque;

measuring flexure directional rotation by providing a detector at each end of the flexure and comparing the signals generated by the detectors; and measuring torque angle by recording the point at which a threshold torque is reached and then measuring the angular motion of the output end of the flexure until a target torque is reached, the step of measuring the angular motion including the steps of:

counting the number of triangular waveforms from the output end detector after the threshold torque is attained; and using the spacing between the lines on the flexure and the number of lines around the flexure to determine the number of degrees of angular motion per waveform peak.

23. The method of claim 22 further comprising the step of:

measuring rotational speed of the flexure by measuring the frequency of the transmitted signals generated by detector at one of the input and output ends of the flexure.

* * * * *